United States Patent
Al-Azem

(10) Patent No.: US 9,517,609 B2
(45) Date of Patent: Dec. 13, 2016

(54) ATTACHMENT SYSTEMS AND METHODS USABLE TO FORM ENCLOSURES

(71) Applicant: Samer Al-Azem, Houston, TX (US)

(72) Inventor: Samer Al-Azem, Houston, TX (US)

(*) Notice: Subject to any disclaimer, the term of this patent is extended or adjusted under 35 U.S.C. 154(b) by 245 days.

(21) Appl. No.: 14/088,091

(22) Filed: Nov. 22, 2013

(65) Prior Publication Data

US 2015/0147494 A1    May 28, 2015

Related U.S. Application Data

(60) Provisional application No. 61/481,296, filed on May 2, 2011.

(51) Int. Cl.
| | | |
|---|---|---|
| *B32B 7/08* | (2006.01) | |
| *B23K 37/00* | (2006.01) | |
| *B32B 1/02* | (2006.01) | |
| *A47G 9/02* | (2006.01) | |
| *E04B 2/74* | (2006.01) | |

(52) U.S. Cl.
CPC .............. *B32B 7/08* (2013.01); *B23K 37/006* (2013.01); *B32B 1/02* (2013.01); *A47G 9/0246* (2013.01); *E04B 2/7425* (2013.01); *Y10T 428/13* (2015.01); *Y10T 428/24008* (2015.01); *Y10T 428/24017* (2015.01)

(58) Field of Classification Search
CPC .............. B32B 1/02; B32B 7/08; E04B 2/721; E04B 2/7425; E04B 2002/747; A47G 9/0246; B65D 33/00; B65D 33/08; Y10T 428/24008; Y10T 428/24017
USPC ....... 52/284, 285.1, 578, 582.1, 591.5, 79.5, 52/79.9, DIG. 13; 220/612, 531, 530, 529, 220/4.22, 552, 551; 428/99, 100; 493/123; 446/108, 114, 115
See application file for complete search history.

(56) References Cited

U.S. PATENT DOCUMENTS

| | | | | |
|---|---|---|---|---|
| 1,533,011 | A * | 4/1925 | Knaggs | 446/112 |
| 2,061,510 | A * | 11/1936 | Drumpelmann | 446/115 |
| 2,075,259 | A * | 3/1937 | Battjes | 446/115 |
| 2,128,509 | A * | 8/1938 | Swope | 229/117.15 |
| 2,828,046 | A * | 3/1958 | Weinman | 220/691 |
| 3,288,349 | A * | 11/1966 | Palmer et al. | 229/149 |
| 3,336,608 | A * | 8/1967 | Lerner | 5/99.1 |
| 3,581,431 | A * | 6/1971 | Trenovan | 446/85 |
| 3,702,520 | A * | 11/1972 | Huber et al. | 52/284 |
| 3,913,598 | A * | 10/1975 | Glutting et al. | 135/152 |
| 4,045,832 | A * | 9/1977 | DiForti et al. | 5/496 |
| 4,257,207 | A * | 3/1981 | Davis | 52/578 |
| 4,523,418 | A * | 6/1985 | McLaughlin | 52/284 |
| 4,617,214 | A * | 10/1986 | Billarant | 428/40.1 |
| 4,887,766 | A * | 12/1989 | Schoeneweis | 229/125 |

(Continued)

FOREIGN PATENT DOCUMENTS

| | | | | |
|---|---|---|---|---|
| DE | 3843151 | A1 * | 7/1990 | E02D 29/12 |
| EP | 329236 | A1 * | 8/1989 | E04C 2/24 |

*Primary Examiner* — Robert Canfield
*Assistant Examiner* — Babajide Demuren

(57) ABSTRACT

Enclosures and panels for forming such enclosures can include a first edge having a front side and a rear side, each side having a first portion of a fastening medium thereon, and a second edge having first and second flaps, each flap having an inner surface with a second portion of the fastening medium thereon. The flaps of a first panel can engaged with the front and rear sides of an adjacent panel, and similarly, any number of adjacent panels can be engaged in this manner to form a sealed enclosure, usable for maintaining a pressure differential between the interior and exterior thereof.

7 Claims, 6 Drawing Sheets

(56) References Cited

U.S. PATENT DOCUMENTS

| | | | | |
|---|---|---|---|---|
| 5,062,234 | A * | 11/1991 | Green | 43/1 |
| 5,374,464 | A * | 12/1994 | Jacobsen et al. | 428/100 |
| 5,409,755 | A * | 4/1995 | Lo Presti et al. | 428/57 |
| 7,014,057 | B2 * | 3/2006 | Wang | 220/7 |
| 2002/0074839 | A1 * | 6/2002 | Mahan | 297/228.1 |
| 2002/0078653 | A1 * | 6/2002 | Jean | 52/578 |
| 2002/0172797 | A1 * | 11/2002 | Sugawara | 428/99 |
| 2003/0168452 | A1 * | 9/2003 | Prutkin et al. | 220/6 |
| 2003/0168502 | A1 * | 9/2003 | Kisch | 229/120.34 |
| 2004/0000582 | A1 * | 1/2004 | Sutherland | 229/103.2 |
| 2004/0022998 | A1 * | 2/2004 | Miyamoto et al. | 428/99 |
| 2004/0055242 | A1 * | 3/2004 | Iwakawa et al. | 52/578 |
| 2004/0178084 | A1 * | 9/2004 | Gomes et al. | 206/170 |
| 2005/0042415 | A1 * | 2/2005 | Baecker et al. | 428/99 |
| 2006/0180642 | A1 * | 8/2006 | Zacher et al. | 229/109 |
| 2007/0063002 | A1 * | 3/2007 | Zacher et al. | 229/109 |
| 2011/0296612 | A1 * | 12/2011 | Papp et al. | 5/424 |
| 2012/0288219 | A1 * | 11/2012 | Chang | 383/105 |

* cited by examiner

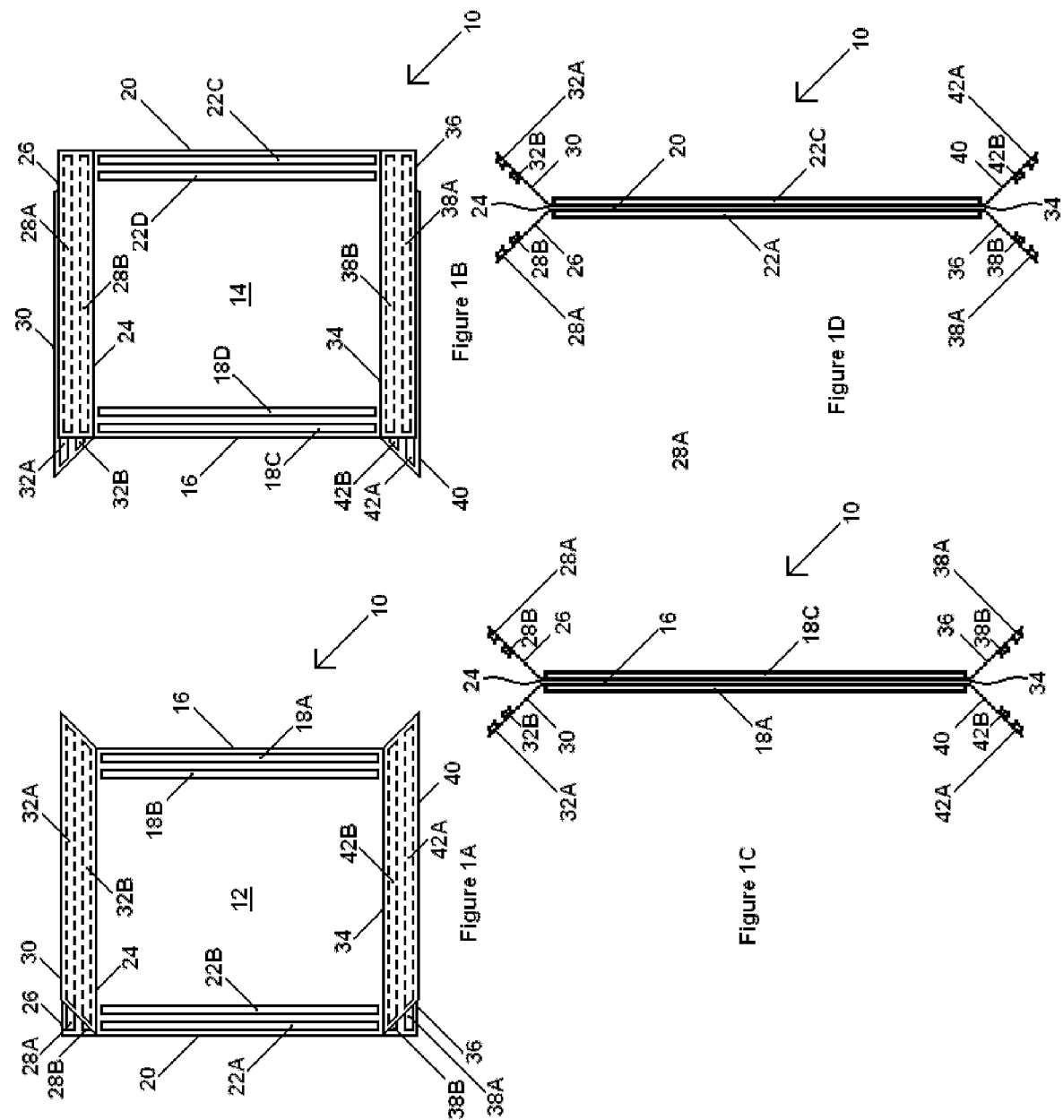

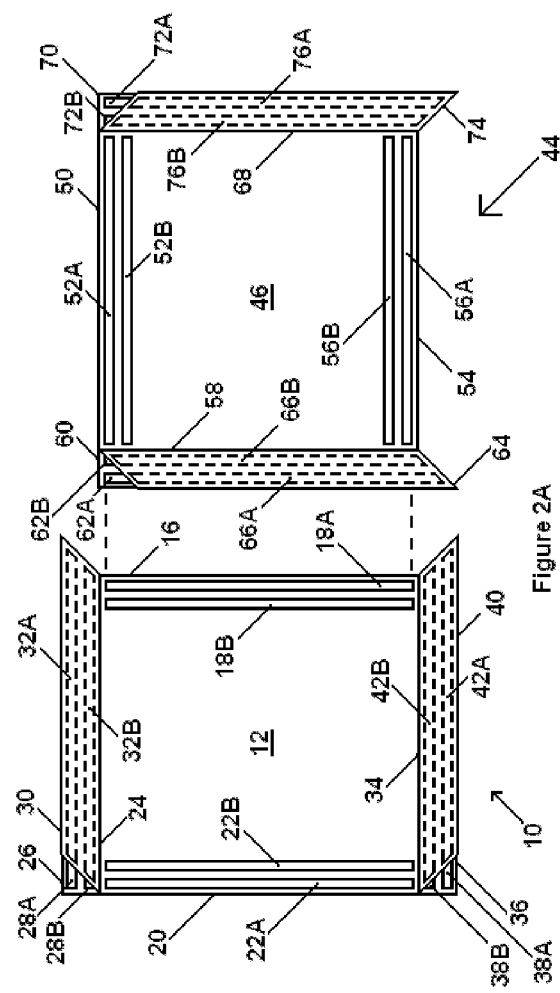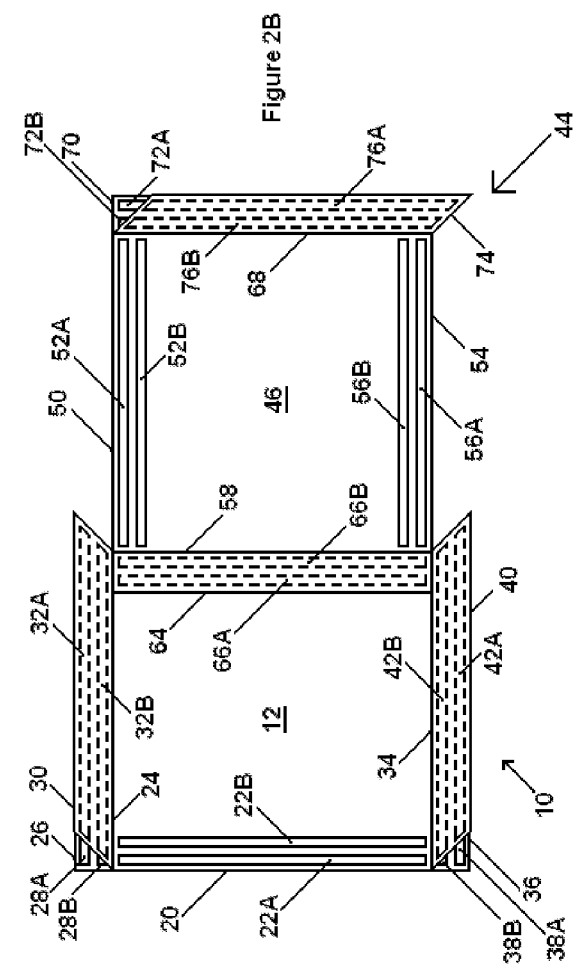

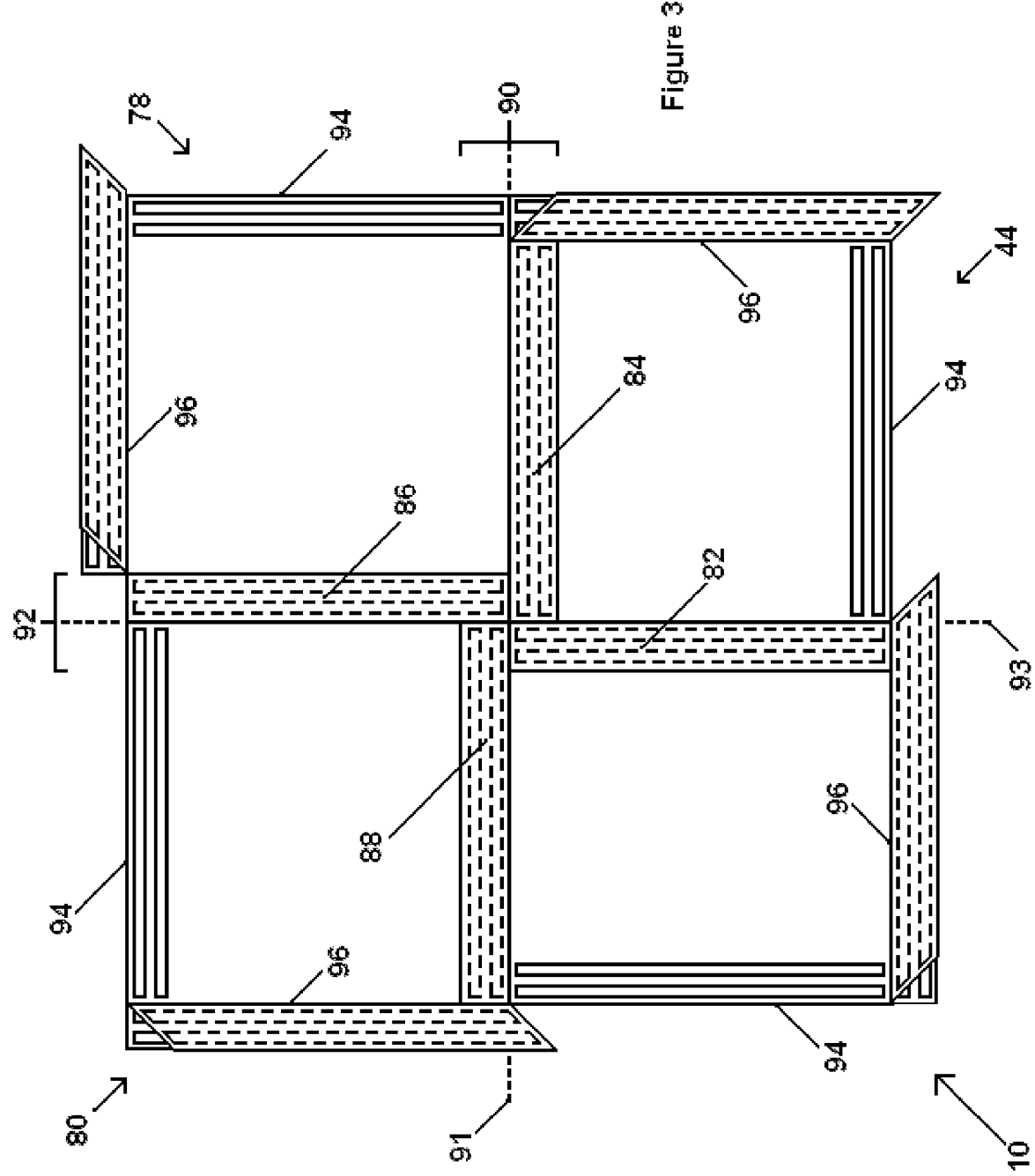

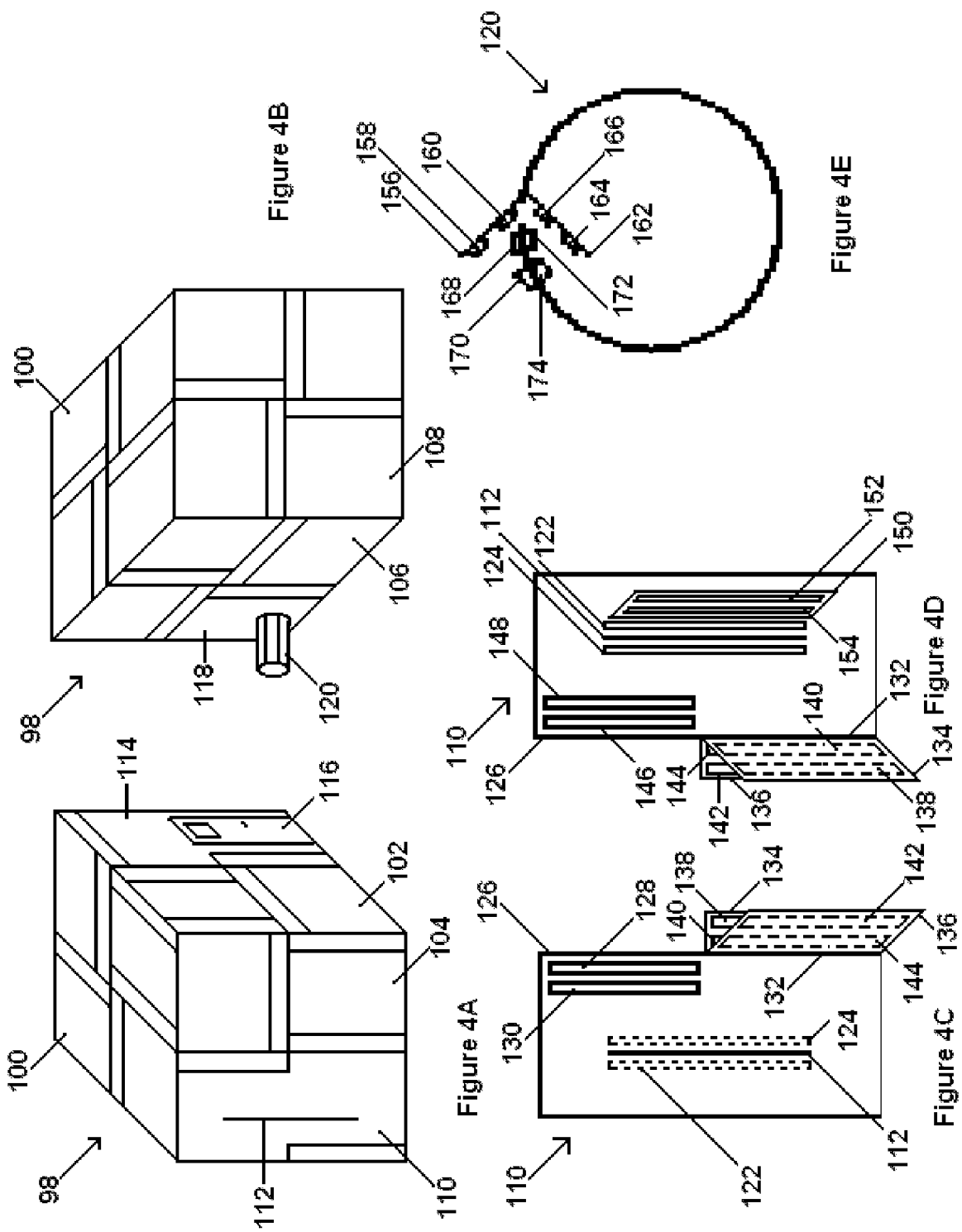

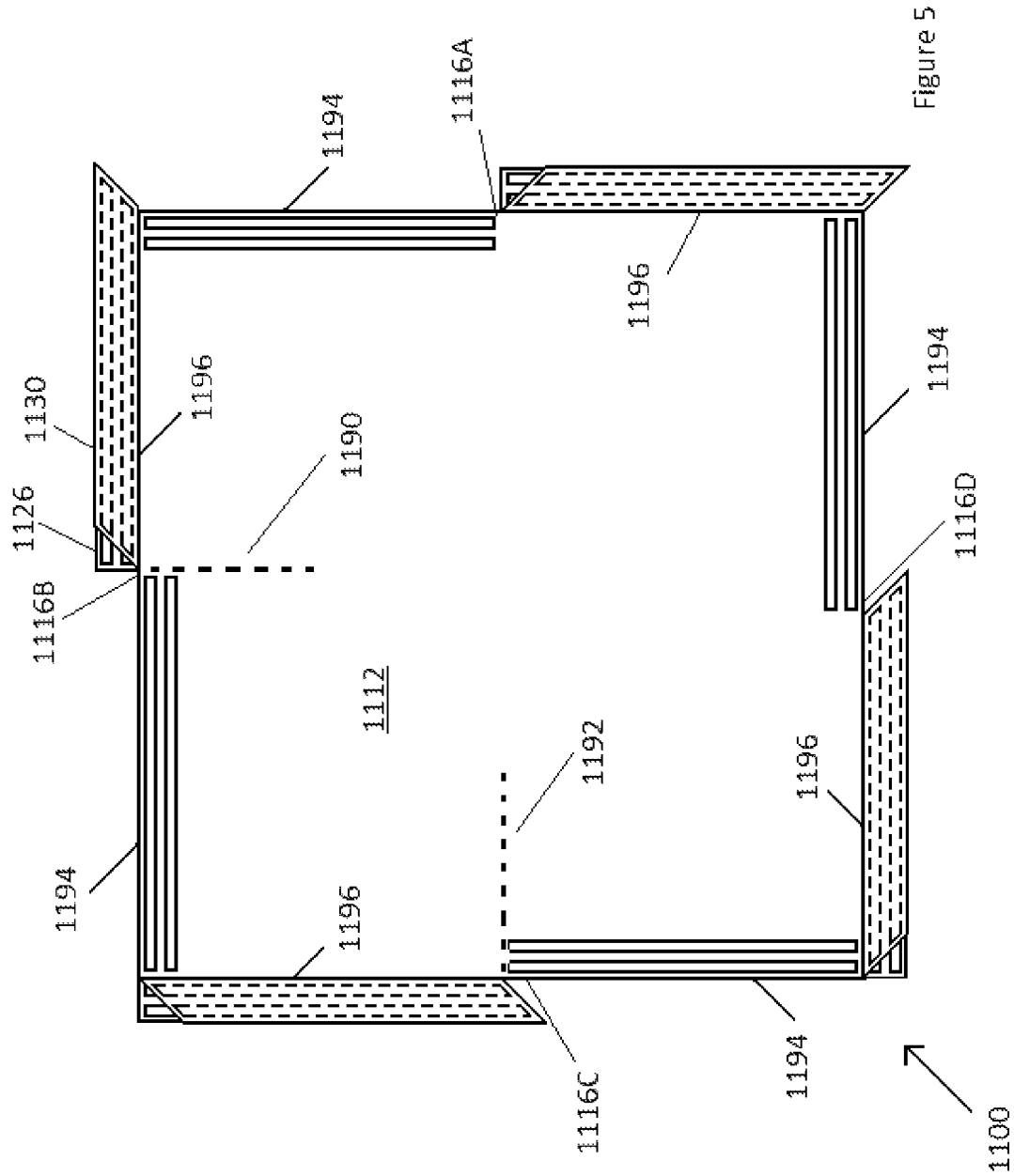

ATTACHMENT SYSTEMS AND METHODS USABLE TO FORM ENCLOSURES

CROSS-REFERENCE TO RELATED APPLICATION

The present application claims priority under 35 U.S.C. §119(e) to and is a continuation-in-part of the co-pending U.S. non-provisional application for patent, having the application Ser. No. 13/461,533, filed May 1, 2012, which claims the benefit of U.S. provisional application, having the application Ser. No. 61/481,296, filed May 2, 2011, both of which are incorporated herein by reference.

FIELD

Embodiments usable within the scope of the present disclosure relate, generally, to systems and methods of attachment usable to form enclosures, and more specifically, to enclosures usable to contain pressure, perform hot-work (e.g., welding operations), or similar functions.

BACKGROUND

When welding or performing other hot-work operations, especially in an offshore environment, it is typically necessary to perform such operations in an isolated enclosure. Such enclosures are sealed to enable a positive pressure to be maintained within, thereby preventing the entry of flammable and/or hazardous gasses, and protecting occupants from inclement weather or other undesirable exterior conditions. Vents and/or blowers are used to transport gasses produced and/or heated by welding or other operations from within the enclosure to the outside, and to flow fresh air into the enclosure, thereby preventing the accumulation of harmful gasses and maintaining a comfortable temperature and working environment within. Normally, the intake vent and/or blower provides air into the enclosure at a rate that exceeds that at which air within the enclosure is evacuated (e.g., a 2:1 ratio), such that the positive pressure within the enclosure is maintained.

Conventional enclosures include rigid panels that are time consuming and difficult to transport and assemble on-site. Alternative enclosures can include inflatable structures and/or flexible structures made from lightweight panels. Typically, a flexible enclosure usable for hot-work operations or similar undertakings includes a series of panels having a portion of a zipper on each edge that must be aligned with a corresponding portion of a zipper along the edge of an adjacent panel to attach the panels together. To prevent exposure of a zipper on the interior of the enclosure to the hot-work environment within, a flap can be used to cover the zipper using Velcro™ or a similar hook-and-loop fastening medium, or other means of attachment. While transport and erection of such a flexible enclosure may be more efficient than many conventional alternatives, alignment, mating, and covering of numerous zippers remains a tedious and time consuming undertaking.

Additionally, flexible enclosures require at least two types of panels to enable mating portions of zippers to be paired and engaged. A lack of interchangeability between panels can often become a hindrance if a panel or zipper is damaged and/or ripped, and a specific type of replacement panel must be located. Additionally, use of zippers is often undesirable due to the propensity of zippers to become caught or damaged when subjected to excessive force or extreme environments. An individual falling into the wall of an enclosure or otherwise forcefully contacting the wall may cause one or more zippers to become damaged or partially unfastened, mitigating the ability of the enclosure to maintain a positive pressure within. When rapid exit from an enclosure is desired for safety reasons, manipulation of a zipper that is covered by a Velcro™ flap or similar fastening medium can be dangerously time consuming and unreliable. Further, if a zipper becomes damaged, the entire engagement between mating panels can be compromised, and on-site repair and/or replacement of a zipper requires tools uncommon to a hot-work environment.

As such, a need exists for systems and methods of attachment usable to form enclosures capable of securely maintaining positive pressure quickly and efficiently, without requiring tedious installation steps such as the mating and alignment of zippers.

A need also exists for systems and methods of attachment usable to form securely sealed enclosures that are far less likely to become unfastened and/or damaged than conventional alternatives.

A further need exists for systems and methods of attachment that can include use of uniform, interchangeable panels that can be mated with one another, avoiding the difficulties associated with production, storage, and installation of multiple types of panels.

Embodiments usable within the scope of the present disclosure meet these needs.

SUMMARY

Embodiments usable within the scope of the present disclosure include panels, usable to form enclosures. A panel can include a first edge having a front side and a rear side, each of the front and rear sides having a first portion of a fastening medium thereon. In a preferred embodiment, the fastening medium can include Velcro™ or a similar hook and loop fastening medium, though it should be understood that other fasteners and/or fastening methods (e.g., reusable or non-reusable adhesive, protrusions, rails, or similar features that mate with corresponding channels and/or orifices, etc.) can be used. A second edge of the panel can have a first flap and a second flap extending therefrom, each of the flaps having an inner surface with a second portion of the fastening medium thereon.

For example, both the front and rear sides of the first edge can include a plurality of strips of a hook portion of a hook and loop fastening medium extending across the length thereof, while both the first and second flap of the second edge can include a plurality of strips of a loop portion of a hook and loop fastening medium extending across the length thereof. Two panels can be connected by placing the first edge of a first panel between the flaps extending from the second edge of a second panel, then moving the flaps to contact the front and rear sides of first edge of the first panel such that the strips of fastening medium along the flaps engage the strips of fastening medium along the first edge. It should be readily understood that the hook portions and loop portions of the fastening medium could be interchanged in any manner or combination without affecting the functionality of the connection. Engagement in this manner can be accomplished rapidly, while providing a seal between connected panels, capable of maintaining a pressure differential across opposing sides of the panels, that withstands significant impact and shear forces without separating.

Embodied panels can include any number of additional edges, having the same configuration as the first edge of the second edge, described above. For clarity, an edge having the configuration of the first edge may be referred to herein as a "male edge" while an edge having the configuration of the second edge may be referred to as a "female edge." A preferred embodiment includes a square panel, in which the length of the first edge (a male edge) is generally equal to that of the second (a female edge), having an additional male edge opposite the first edge with a substantially identical configuration to the first edge, and an additional female edge opposite the second edge having a substantially identical configuration to the second edge. This configuration provides a panel that can be engaged with up to four identical panels, from any direction, by mating a male edge the panel with a female edge of an additional panel, or a female edge of the panel with a male edge of an additional panel. As such, any number of interchangeable panels can be engaged in this manner to form a barrier or enclosure having any desired size or shape.

The panels can include one or more heat resistant materials (e.g., fiberglass, silicone, other polymers), such that formation of an enclosed region using multiple panels can form an enclosure suitable for performing welding and/or other hot-work operations within.

Embodiments usable within the scope of the present disclosure also include enclosures, usable for performing welding and/or other hot-work operations, or for other purposes. It should be understood that while welding operations are often performed within fully enclosed structures (e.g., having four or more walls, a ceiling, and a floor), the term "enclosure" as used herein can also include any partial structure or barrier. For example, a structure having multiple walls that lacks a ceiling could be used to safely perform welding at a construction site, where it is desirable to prevent slag or other materials from falling into streets or other public or traveled areas, but where maintenance of a positive pressure is unnecessary. Similarly, individual walls or other barriers, usable for various purposes, could be constructed using embodiments of the present disclosure.

Embodied enclosures can include a first panel with a male edge having a front side and a rear side, each comprising a first portion of a fastening medium thereon; and a second panel having a female edge with a first and second flap extending therefrom, each flap having an inner surface with a second portion of the fastening medium thereon. The first flap of the second panel can be engaged with the front side first panel, and the second flap can be engaged with the rear side, via engagement between the first and second portions of the fastening medium.

As described above, in an embodiment, the first and second portions of the fastening medium can include corresponding hook and loop portions of Velcro™ or a similar hook and loop fastening medium, and the fasting medium can extend in a plurality of strips across the length of each edge of the panels to facilitate a secure seal therebetween. The panels can include a heat resistant material, thus enabling embodied enclosures to be usable for welding, hot-work, or similar purposes.

Further embodiments usable within the scope of the present disclosure can include an enclosure having one or more walls formed from four or more panels. Each panel can include at least one male edge having a front and a rear side, and at least one female edge having two or more flaps, the front and rear sides and inner surfaces of the flaps having a fastening medium thereon, as described previously.

For example, a wall of the enclosure can be formed by engaging a male edge of the second panel with a female edge of the first panel, engaging a male edge of the third panel with a female edge of the second panel, engaging a male edge of the fourth panel with a female edge of the third panel, and engaging a male edge of the first panel with a female edge of the fourth panel. In this manner, a wall can be provided with a generally square shape; however, it should be understood that panels having non-square shapes can be used to form walls having other shapes, if desired, or alternatively, more than four panels, or fewer than four panels, can be used to form walls and/or enclosures having other shapes and/or configurations.

In an embodiment, engagement between the first and second panels can define a first axis, while engagement between the third and fourth panels can define a second axis. The first and second axis can be offset from one another in a perpendicular direction, such that the engagement of a first portion of the wall (which includes the first and second panels) is disposed in an overlapping relationship relative to that of a second portion of the wall (which includes the third and forth panels).

Additionally or alternatively, engagement between the second and third panels can define a first axis, while engagement between the first and fourth panels can define a second axis, offset a distance from the first axis in a perpendicular direction, forming an overlapping relationship between portions of the wall. Thus, in an exemplary embodiment, engagement between two horizontally adjacent panels can be horizontally offset from the opposing engagement between two other horizontally adjacent panels, while the opposing vertical engagements between adjacent panels can be similarly offset from one another. This overlapping, offset relationship between engagements can provide improved shear strength and impact resistance.

One or more of the panels within the wall can include additional male and/or female edges, used to engage additional panels for forming an enclosure. Adjacent panels can be angled (e.g, pivoted, folded, and/or bent) relative to one another at the point of engagement, enabling walls to be placed in a perpendicular or other angular relationship relative to one another. Engagement between panels can form seals capable of maintaining a pressure differential on opposing sides thereof and/or forming an enclosed space adapted for performing welding or other hot-work operations.

Embodiments usable within the scope of the present disclosure thereby provide systems and methods of attachment usable to securely maintain positive pressure and/or otherwise provide a seal and/or connection between adjacent members having significant resistance to impact and/or shear forces, that can be quickly and efficiently installed, and that can further incorporate use of interchangeable members.

BRIEF DESCRIPTION OF THE DRAWINGS

In the detailed description of various embodiments usable within the scope of the present disclosure, presented below, reference is made to the accompanying drawings, in which:

FIG. 1A depicts a diagrammatic front view of an embodiment of a panel usable within the scope of the present disclosure.

FIG. 1B depicts a diagrammatic rear view of the panel of FIG. 1A.

FIG. 1C depicts a diagrammatic right side view of the panel of FIG. 1A.

FIG. 1D depicts a diagrammatic left side view of the panel of FIG. 1A.

FIG. 2A depicts an exploded diagrammatic front view of an engagement between two panels usable within the scope of the present disclosure.

FIG. 2B depicts a diagrammatic front view of the engagement of FIG. 2A.

FIG. 3 depicts a diagrammatic front view of an engagement between four panels usable within the scope of the present disclosure.

FIG. 4A depicts an isometric side view of an embodiment of an enclosure usable within the scope of the present disclosure.

FIG. 4B depicts an isometric view of an opposing side of the enclosure of FIG. 4A.

FIG. 4C depicts a diagrammatic front view of an escape panel of the enclosure of FIG. 4A.

FIG. 4D depicts a diagrammatic rear view of the escape panel of FIG. 4C.

FIG. 4E depicts a diagrammatic end view of a blower engagement of the enclosure of FIG. 4A.

FIG. 5 depicts an diagrammatic front view of an alternative arrangement for a panel usable within the scope of the present disclosure.

Figure 2C:
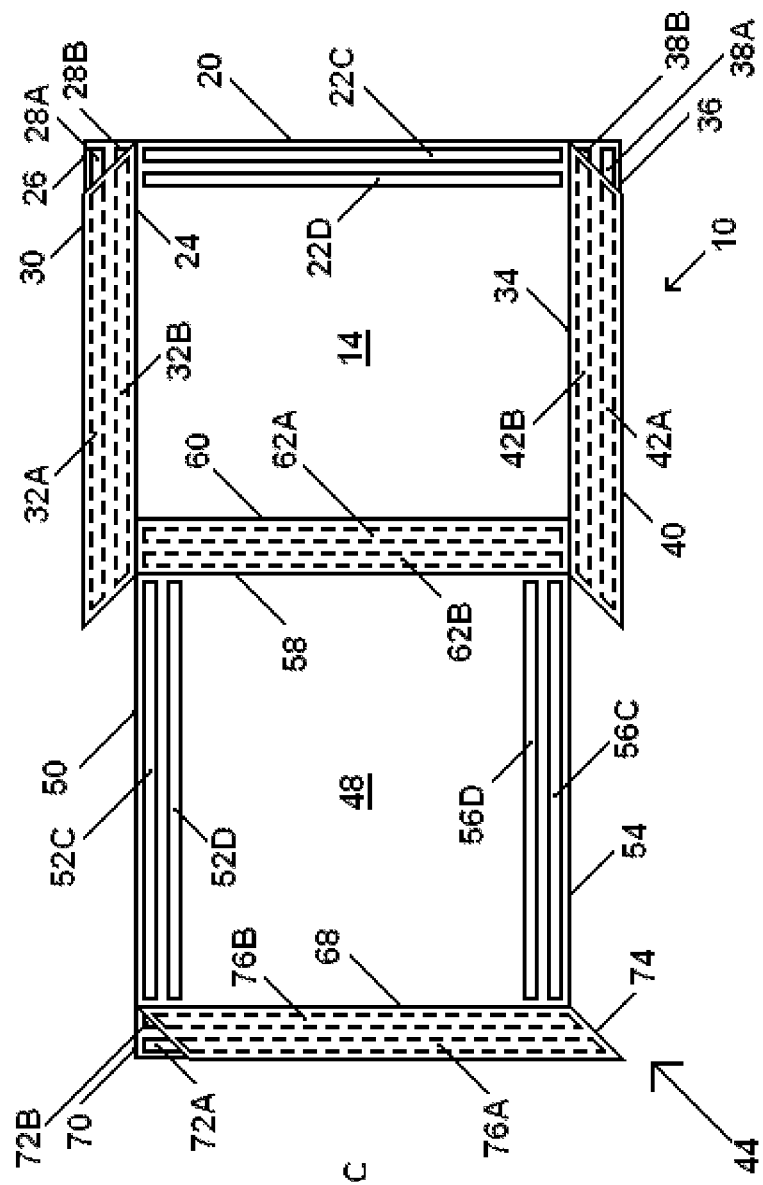
FIG. 2C depicts a diagrammatic rear view of the engagement of FIG. 2B.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Embodiments usable within the scope of the present disclosure relate to systems and methods of attachment usable to form enclosures suitable for welding, hot-work operations, and/or other purposes using one or more panels that can be engaged to form barriers and enclosures. FIGS. 1A through 1D depict an embodiment of a panel (10), in which FIG. 1A depicts a diagrammatic front view thereof, FIG. 1B depicts a diagrammatic rear view, FIG. 1C depicts a diagrammatic right side view, and FIG. 1D depicts a diagrammatic left side view.

The panel (10) is shown having a generally thin, square-shaped body, with a front side (12) and a rear side (14). While the panel (10) can be formed from any generally durable material able to maintain its shape, in an embodiment, the panel can be formed from flexible, lightweight, and/or heat resistant materials, such as coated fiberglass, silicone, and/or various other polymers, composites, or other similar materials. Additionally, while the panel (10) is depicted having square shape, it should be understood that panels having other shapes and/or dimensions can be used without departing from the scope of the present disclosure. Further, while the terms "front side" and "rear side" are used to refer to opposing faces of the panel (10), it should be understood that these terms are for reference only, and embodiments of the present disclosure can include panels that are reversible without affecting the function thereof. For example, an embodied panel could include a front side having a first color or characteristic and a rear side having a second color or characteristic, and the panel could be oriented such that a side having a desired characteristic faces the exterior of an enclosure (e.g., for selectively retaining or reflecting heat from the sun).

The depicted panel (10) is shown having a first male edge (16), a second male edge (20) opposite the first male edge (16), a first female edge (24), and a second female edge (34) opposite the first female edge (24).

The first male edge (16) is shown having four portions of a fastening medium (18A, 18B, 18C, 18D) positioned thereon. In a preferred embodiment, the depicted fastening medium (18A, 18B, 18C, 18D) can include strips of Velcro™ or a similar hook and loop fastening medium, though it should be understood that other fastening media and/or means of connection can also be used without departing from the scope of the present disclosure. While these portions of fastening medium (18A, 18B, 18C, 18D) may hereafter be referred to as "hook strips," while corresponding, mating portions of the fastening media may be referred to as "loop strips," it should be readily apparent that the placement of hook and loop portions can be interchanged without affecting the function of the depicted embodiments, and that while strips of fastening media extending across the length of the panel (10) are shown, any number and configuration of mating portions of a fastening medium can be used.

Specifically, the first male edge (16) is depicted having two hook strips (18A, 18B) extending along the length thereof, positioned on the front side (12) of the panel (10), and two hook strips (18C, 18D) extending along the length thereof, positioned on the rear side (14) of the panel (10). The second male edge (20) is shown having a similar configuration of fastening media (22A, 22B, 22C, 22D), hereafter referred to as "hook strips," in which two hook strips (22A, 22B) extend along the length of the second male edge (20) and are positioned on the front side (12) of the panel (10), while two additional hook strips (22C, 22D) extend along the length of the second male edge (20) and are positioned on the rear side (14) of the panel (10).

The first female edge (24) is shown having two flaps (26, 30) extending therefrom, in a direction outward from the body of the panel (10). The flaps (26, 30) can be moved and/or pivoted relative to the body of the panel (10), e.g., as illustrated by the orientation of the flaps (26, 30) shown in FIGS. 1A and 1B, and the differing orientation shown in FIGS. 1C and 1D. The first flap (26) is shown having two portions of a fastening medium (28A, 28B), hereafter referred to as "loop strips," extending across the length of the inner surface thereof. The second flap (30) is similarly shown having two portions of the fastening medium (28C, 28D), hereafter referred to as "loop strips," extending across the length of the inner surface thereof. The second female edge (34) is shown having a similar configuration, in which two flaps (36, 40) extend therefrom. The first flap (36) is shown having two portions of a fastening medium (38A, 38B), hereafter referred to as "loop straps," extending across the length of the inner surface thereof. The second flap (40) is also shown having two portions of the fastening medium (42A, 42B), hereafter referred to as "loop straps," extending across the length of the inner surface thereof.

The depicted panel (10) can be engaged with a generally similar and/or identical panel by placing either male edge (16, 20) of the panel (10) adjacent to a female edge of an additional panel, then closing the flaps of the female edge over the male edge (16, 20), such that a first flap contacts the front side (12), causing loop straps on the flap to engage hook straps (18A, 18B, 22A, 22B) on the front side (12), and a second flap contacts the rear side (14), causing loop straps on the flap to engage hook straps (18C, 18D, 22C, 22D) on the rear side (14).

The depicted panel (10) can also be engaged with a generally similar and/or identical panel by placing either female edge (24, 34) adjacent to a male edge of an additional panel, then closing the flaps (26, 30, 36, 40) over the male edge, such that a first flap contacts a front side of the male edge and a second flap contacts a rear side of the male edge, causing engagement between the loop straps (28A, 28B, 38A, 38B) of one of the flaps (26, 36) and one side of the male edge, and engagement between the loop straps (32A, 32B, 42A, 42B) of the opposing flap (30, 40) and the opposing side of the male edge.

FIGS. 2A through 2C depict an engagement between two panels (10, 44) usable within the scope of the present disclosure. Specifically, FIG. 2A depicts an exploded diagrammatic front view of engagement between the panels (10, 44), with dashed lines extending therebetween to indicate a connection. FIG. 2B depicts a diagrammatic front view of the engagement, while FIG. 2C depicts a diagrammatic rear view thereof.

The first panel (10) is substantially identical to that shown in FIGS. 1A through 1D, and as such, identical and/or similar corresponding parts have been provided with the same reference numerals. The second panel (44), shown adjacent to and engaged with the first panel (10), is depicted as identical or substantially similar to the first panel (10), rotated ninety degrees such that a female edge of the second panel (44) is positioned to engage the first male edge (16) of the first panel (10). Use of identical panels enables interchangeable assembly and/or replacement of the panels, facilitating rapid installation and/or repair of enclosures.

Specifically, the second panel (44) is shown having a front side (46) and a rear side (48), a first male edge (50), a second male edge (54), a first female edge (58), and a second female edge (68).

The first male edge (50) includes two portions of a fastening medium (52A, 52B), hereafter referred to as "hook strips," extending across the length of the front side (46), and two portions of the fastening medium (52C, 52D), hereafter referred to as "hook strips," extending across the length of the rear side (48). The second male edge (54) also includes two portions of the fastening medium (56A, 56B), hereafter referred to as "hook strips," extending across the length of the front side (46), and two portions of the fastening medium (56C, 56D), hereafter referred to as "hook strips," extending across the length of the rear side (48).

The first female edge (58) is shown having two flaps (60, 64) extending therefrom, the first flap (60) having two portions of the fastening medium (62A, 62B), hereafter referred to as "loop strips," extending across the length thereof, and the second flap (64) having two portions of the fastening medium (66A, 66B), hereafter referred to as "loop strips," extending across the length thereof. Similarly, the second female edge (68) is shown having two flaps (70, 74) extending therefrom, the first flap (70) having two portions of the fastening medium (72A, 72B), hereafter referred to as "loop strips," extending across the length thereof, and the second flap (74) having two portions of the fastening medium (76A, 76B), hereafter referred to as "loop strips," extending across the length thereof.

To engage the first panel (10) with the second panel (44), the first male edge (16) of the first panel (10) can be placed proximate and/or adjacent to the first female edge (58) of the second panel (44), such that the first male edge (16) is positioned between the flaps (60, 64) extending from the first female edge (58). The flaps (60, 64) extending from the first female edge (58) can then be moved (e.g., closed and/or pivoted) to contact the first male edge (16), thereby engaging hook strap (18A) with loop strap (66B), hook strap (18B) with loop strap (66A), hook strap (18C, shown in FIG. 1B) with loop strap 66B, and hook strap (18D, shown in FIG. 1B) with loop strap (66A).

The depicted engagement between the panels (10, 44) mates four hook strips (18A, 18B, 18C, 18D) of a hook and loop fastening medium with four loop strips (62A, 62B, 66A, 66B) of the hook and loop fastening medium, each of the strips extending across substantially the entire length of the panels (10, 44). The depicted engagement can form a seal capable of maintaining a pressure differential on opposing sides of the panels (10, 44) (e.g., for forming a positive pressure environment within an enclosure). Additionally, the depicted engagement exhibits significantly improved impact resistance and shear strength over seals within conventional flexible enclosures (e.g., formed using zippers or other conventional fasteners).

While FIGS. 2A through 2C depict a single engagement between two panels (10, 44), it should be noted that other additional panels having male and/or female edges, as described above, can be engaged with the depicted panels (10, 44) in a similar manner, to form a barrier and/or enclosure of any desired size or shape. Additionally, while FIGS. 2A through 2C show a female edge (58) of the second panel (44) engaging a male edge (16) of the first panel (10), it should be understood that any orientation and engagement between any male edge and any female edge of two adjacent panels can be used. The panels (10, 44) can be moved and/or pivoted relative to one another at the point of engagement along the first female edge (58). Thus, for example, five or more panels having the depicted configuration, and/or five or more generally flat barriers (e.g., walls) formed from multiple panels, could be engaged in the manner described above and placed in a perpendicular relationship relative to one another to define an enclosure having the shape of a cube or rectangular prism. During operations where a full enclosure is not necessary, panels and/or groups of panels could be engaged to form an enclosed space, lacking a cover or roof.

Referring now to FIG. 3, a diagrammatic front view of an engagement between four panels (10, 44, 78, 80) is shown, e.g., forming a generally continuous wall usable as part of an enclosure. Each of the depicted panels (10, 44, 78, 80) includes a configuration similar or identical to that of the panels depicted in FIGS. 1A through 2C, thus for clarity, only the operative edges of each panel (10, 44, 78, 80) and engagements therebetween are labeled with reference numerals.

Specifically, the first panel (10) is shown is shown engaged with the second panel (44) at engagement (82), which can be formed through connection between hook and loop fastening media disposed on a male edge of the first panel (10) and a female edge of the second panel (44) in the manner described previously. Similarly, the second panel (44) is shown engaged with the third panel (78) at engagement (84), which can be formed through connection between hook and loop fastening media disposed on a male edge of the second panel (44) and a female edge of the third panel (78). The third panel (78) is shown engaged with the fourth panel (80) at engagement (86), which can be formed through connection between hook and loop fastening media disposed on a male edge of the third panel (78) and a female edge of the fourth panel (80). The fourth panel (80) is shown engaged with the first panel (10) at engagement (88), which can be formed through connection between hook and loop fastening media disposed on a male edge of the fourth panel (80) and a female edge of the first panel (10).

Engagement between the first and fourth panels (10, 80) and between the third and second panels (78, 44) thereby defines a first axis (91), while engagement between the first and second panels (10, 44) and between the third and fourth panels (78, 80) defines a second axis (93). Due to the arrangement of male and female edges on the panels (10, 44, 78, 80), each of the engagements (82, 84, 86, 88) are offset from the adjacent axes (91, 93), providing the depicted array of panels with an overlapping engagement. For example, the first and third engagements (82, 86) are offset from one another by a distance (92), while the second and fourth engagements (84, 88) are offset from one another by a distance (90). This overlapping arrangement provides the depicted engagements between panels with added strength. For example, impacts, wind, and/or other forces applied to the panels (10, 44, 78, 80) are significantly less likely to separate offset engagements than two engagements in linear alignment with one another.

As described previously, the depicted arrangement of panels (10, 44, 78, 80) can be engaged with additional panels to form walls or barriers of any size, or to form sealed enclosures suitable for performing welding and/or similar operations. For example, the panels (10, 44, 78, 80) are shown including additional male edges (94) usable for engagement with female edges of additional panels in the manner described previously, and additional female edges (96) usable for engagement with male edges of additional panels in the manner described previously.

FIGS. 4A through 4E depict an embodiment of an enclosure (98), e.g., a structure formed from a plurality of walls such as that shown in FIG. 3, and parts thereof, usable to perform various undertakings within, such as hot-work operations. Specifically, FIG. 4A depicts an isometric side view of the enclosure (98), FIG. 4B depicts an opposing isometric side view thereof, FIGS. 4C and 4D depict front and rear views of an escape panel (110) of the enclosure (98), respectively, and FIG. 4E depicts a diagrammatic end view of a blower engagement (120) of the enclosure (98).

The enclosure (98) is shown having a generally cubical shape, in which a ceiling (100), four walls (102, 104, 106, 108), and optionally, a base (not shown), each having a configuration identical or similar to that of the wall shown in FIG. 3, can be engaged in the manner described previously. As described above, engagement between overlapping male and female edges using strips of hook and loop fastening media can provide a generally airtight seal to form an enclosure capable of maintaining a positive pressure within.

A first wall (102) is shown having a door (116) installed therein, the panel of the first wall (102) that includes the door having a height selected to accommodate the door (116). The depicted panel therefore includes both a male and a female engagement on a single edge thereof, for engaging two adjacent panels.

A second wall (104) is shown having an escape panel (110) installed therein, the escape panel (110) including a slit (112) through which an individual can quickly exit the enclosure (98) should internal or external conditions become hazardous. Conventional exit panels include a slit or similar opening that is secured in a closed position using a zipper. Due to the hazards inherent when a zipper faces the inside of an enclosure used for performing hot work and similar dangerous undertakings, these zippered openings are normally covered by a flap of material, which can be secured using Velcro™ or a similar medium. When escape from the enclosure is necessary, both the cover flap and the zipper must be manipulated quickly, and rapid manipulation of a zipper can cause the zipper to become damaged or caught.

The depicted escape panel (110), however, as shown in FIGS. 4C and 4D, does not include a zipper or similar fastener and simply maintains an open slit (112), which is coverable by a flap (150). The slit (112) is shown having two strips of a hook and loop fastening medium (122, 124) on either side thereof, extending along the length of the slit (112). The flap (150) is similarly shown having two strips of a hook and hoop fastening medium (150, 152) attached on an interior side thereof, such that when the flap (150) is folded, pivoted, and/or otherwise moved to cover the slit (112), fastening medium (122) is engaged by fastening medium (150), while fastening medium (124) is engaged by fastening medium (152). The depicted arrangement, using four strips of fastening medium (122, 124, 152, 154) extending along the length of the slit (112), provides a secure engagement able to maintain a positive pressure within the enclosure (98), that is extremely unlikely to become damaged or disengaged due to impact or other internal or external forces common to a hot work environment. Additionally, the depicted arrangement provides a slit (112) that is more easily uncovered and accessed than a conventional zippered panel.

The depicted escape panel (110) is also shown having a male engagement (126) and a female engagement (132) on an edge thereof, usable to engage two adjacent panels in the manner described previously. Other edges of the escape panel (110) can similarly include male and female engagements (not shown) for engaging the escape panel (110) with other portions of the enclosure (98), as depicted in FIG. 4A.

The third wall (106) of the enclosure (98) is shown having a blower engagement (120), usable, in various embodiments, to engage a conduit of a blower, vent, pump, or similar apparatus configured for flowing one or more gasses into or from the enclosure (98). The blower engagement (120) is shown having male and female portions, the male portion including four strips of hook and loop fastening medium (168, 170, 172, 174) on opposing sides thereof, and the female portion including two flaps (156, 162), each flap (156, 162) having two strips of hook and loop fastening medium (158, 160, 162, 164) thereon. When closed (e.g., engaged about a conduit of a blower), fastening medium (158) engages fastening medium (170), fastening medium (160) engages fastening medium (168), fastening medium (164) engages fastening medium (174), and fastening medium (166) engages fastening medium (172). Use of the depicted arrangement provides for an adjustable, generally gas-tight conduit of the enclosure (98) usable to engage a blower, vent, or similar apparatus.

Embodiments described herein thereby provide systems and methods of attachment usable to form enclosures capable of securely maintaining positive pressure quickly and efficiently, without requiring mating and alignment of zippers or similar two-part fastening systems, the embodied enclosures being significantly more secure and far less likely to become unfastened and/or damaged than conventional alternatives. Embodiments described herein can also include interchangeable panels, and in various embodiments, panels having special features, such as doors, escape panels, and/or blower engagements can be used.

Referring now to FIG. 5, a diagrammatic front view of a single panel is shown, e.g. depicting a "universal" panel (1100) useable within the scope of the present disclosure. The panels described above and depicted in FIGS. 1A, 1B, 1C, 1D, 2A, and 2B present a challenge when odd combinations of panels are used in construction of an enclosure, wherein the panels (10) result in a miss-matched male edge (16) meeting another male edge and thus not being able to provide a completed enclosure without reconstructing the arrangement of panels. The universal panel (1100) is shown having a generally thin, square-shaped body, with a front side (1112) and a rear side (not shown). While the universal panel (1100) can be formed from any generally durable material able to maintain its shape, in an embodiment, the panel can be formed from flexible, lightweight, and/or heat resistant materials, such as coated fiberglass, silicone, and/or other various other polymers, composites, or other similar materials. Additionally, while the panel (1100) is depicted having a substantially square shape, it should be understood that panels having other shapes and/or dimensions can be used without departing from the scope of the present disclosure. Further, the terms "front side" (1112) and "rear side" (not shown) are used to refer to opposing faces of the universal panel (1100), it should be understood that these terms are for reference only, and embodiments of the present disclosure can include panels that are reversible without affecting the function thereof.

The depicted universal panel (10) is shown having four edges (1116A, 1116B, 1116C, 1116D). Each edge (1116A, 1116B, 1116C, 1116D) is shown having a male edge (1194) extending substantially half the length of any particular edge (1116A, 1116B, 1116C, 1116D). Each edge (1116A, 1116B, 1116C, and 1116D) is further shown having a female edge (1196) extending along substantially the other half of any particular edge (1116A, 1116B, 1116C, 1116D). A male edge (1194) is shown having two portions of fastening medium extending along the length of male edge (1194), the portions of fastening medium may be of the type and nature discussed and depicted in reference to FIGS. 1A, 1B, 1C, and 1D (18A, 18B). The female edge (1196) is shown having two flaps (1126, 1130) extending therefrom along the length of the female edge (1196), in a direction outward from the body of the universal panel (1100). The flaps (1126, 1130) may be moved and/or pivoted relative to the body of the panel (1100). The female edge (1196) and the two flaps (1126, 1130) extending therefrom of FIG. 5 may include portions of fastening medium as discussed and depicted in reference to FIGS. 1A, 1B, 1C, and 1D (28A, 28B, 28C, 28D). The types of fastening media used in an embodiment may vary as discussed earlier in this disclosure.

The arrangement of each edge (1116A, 1116B, 1116C, 1116D) being of the same orientation provides a universal panel (1100), in that each rotation of 90 degrees of the universal panel (1100) allows for the panel to be connected to any adjoining universal panel (1100). It should be understood that the orientation of the male edges (1194) and female (1196) may be reversed, so long as each edge (1116A, 1116B, 1116C, 1116D) is substantially similar, so that each rotation of 90 degrees of the universal panel (1100) provides a substantial engagement with a corresponding universal panel (1100). The arrangement of each edge (1116A, 1116B, 1116C, 1116D) along the panel (1100) provides a first axis (1190) formed between edge (1116A) and edge (1116C) and a second axis (1192) formed between edge (1116B) and edge (1116D). The first axis being disposed generally parallel to the second axis, as depicted in FIG. 5. It should be understood that the universal panel (1100) may incorporate other features on or extending through the front and rear surfaces, such as, but not limited to, slits, openings, doors, windows, hatches, tubes, pipes, tunnels, sleeves, fasteners, rings, catches, attachment points, or other similar objects, as discussed previously herein with relation to other embodiments of the disclosure.

While various embodiments usable within the scope of the present disclosure have been described with emphasis, it should be understood that within the scope of the appended claims, the present invention can be practiced other than as specifically described herein.

What is claimed is:

1. A panel for forming an enclosure, the panel comprising:
a first edge having a front side and a rear side, wherein the front side and the rear side each comprise a first portion of a fastening medium thereon extending substantially a first half length of the first edge; and the first edge having a first flap and a second flap extending therefrom substantially a second half length of the first edge, wherein the first flap and the second flap each have an inner surface comprising a second portion of the fastening medium thereon adapted for engagement with a second, first portion of the fastening medium;

a second edge, a third edge, and a fourth edge; the second, third and fourth edges each having a front side and a rear side, wherein the front side and the rear side the second, third, and forth edge respectively comprises a first portion of a fastening medium thereon extending substantially a first half length of the second, third, and forth edges, respectively;

the second, third, and fourth edges having a first flap and a second flap extending therefrom substantially a second half length of the second, third, and fourth edges, respectively, wherein the first flap and the second flap each have an inner surface comprising a second portion of the fastening medium thereon adapted for engagement with a second, first portion of the fastening medium;

the first edge and second edge disposed along a first axis and opposite each other so that the first portion of the fastening medium of the first edge is substantially opposite the second portion of the fastening medium of the first and second flaps of the second edge, and the second portion of the fastening medium of the first and second flaps of the first edge is substantially opposite the first portion of fastening medium of the second edge; and the third edge and fourth edge disposed along a second axis and opposite each other so that the first portion of the fastening medium of the third edge is substantially opposite the second portion of the fastening medium of the first and second flaps of the fourth edge, and the second portion of the fastening medium of the first and second flaps of the third edge is substantially opposite the first portion of fastening medium of the fourth edge, wherein the first axis of the first and second edges is disposed perpendicular the second axis of the third and fourth edges.

2. The panel of claim 1, wherein the panel is formed at least partially from a heat resistant material.

3. The panel of claim 1, wherein the first portion of the fastening medium, the second portion of the fastening medium, or combinations thereof, comprise a plurality of strips of a hook and loop fastening medium.

4. An enclosure comprising:
a first panel having a first edge with a front side and a rear side, wherein the front side and the rear side each comprise a first portion of a fastening medium thereon extending substantially a first half length of the first edge; the first edge having a first flap and a second flap extending therefrom substantially a second half length of the first edge, wherein the first flap and the second flap each have an inner surface comprising a second portion of the fastening medium thereon adapted for engagement with a first portion of the fastening medium; and
a second panel having a second edge with a front side and a rear side, wherein the front side and the rear side each comprise a first portion of a fastening medium thereon extending substantially a first half length of the first edge; the first edge having a first flap and a second flap extending therefrom substantially a second half length of the first edge, wherein the first flap and the second flap each have an inner surface comprising a second portion of the fastening medium thereon adapted for engagement with a second, first portion of the fastening medium;
wherein the first edge of the first panel engages the second edge of the second panel, so that the first portion of the fastening medium of the first edge of the first panel engages with the second portion of fastening medium of the second edge of the second panel and the second portion of the fastening medium of the first edge of the first panel engages with the first portion of the fastening medium of the second edge of the second panel.

5. The enclosure of claim 4, wherein engagement between the first flap and the front side, engagement between the second flap and the rear side, or combinations thereof, forms a seal adapted to maintain a pressure differential across opposing sides thereof.

6. The enclosure of claim 4, wherein the first portion of the fastening medium, the second portion of the fastening medium, or combinations thereof, comprise a plurality of strips of a hook and loop fastening medium.

7. The enclosure of claim 4, wherein the first panel, the second panel, or combinations thereof, is formed at least partially from a heat resistant material.

\* \* \* \* \*